(12) United States Patent
Igumnov et al.

(10) Patent No.: US 9,693,211 B2
(45) Date of Patent: Jun. 27, 2017

(54) METHOD AND APPARATUS FOR DYNAMIC LOCATION-BASED GROUP FORMATION FOR A MOVABLE INCIDENT SCENE

(71) Applicant: MOTOROLA SOLUTIONS, INC, Schaumburg, IL (US)

(72) Inventors: Alexei Vladimirovich Igumnov, St. Petersburg (RU); Fedor Grigorievich Saveliev, St. Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/114,417

(22) PCT Filed: Mar. 24, 2014

(86) PCT No.: PCT/RU2014/000186
§ 371 (c)(1),
(2) Date: Jul. 27, 2016

(87) PCT Pub. No.: WO2015/147670
PCT Pub. Date: Oct. 1, 2015

(65) Prior Publication Data
US 2017/0006449 A1    Jan. 5, 2017

(51) Int. Cl.
*H04M 11/04*    (2006.01)
*H04W 4/22*    (2009.01)
(Continued)

(52) U.S. Cl.
CPC ............. *H04W 4/22* (2013.01); *H04W 4/022* (2013.01); *H04W 4/027* (2013.01); *H04W 4/028* (2013.01);
(Continued)

(58) Field of Classification Search
CPC ....... H04W 4/22; H04W 4/022; H04W 4/027; H04W 4/028; H04W 4/046; H04W 4/08; H04W 4/10; H04W 76/005; H04W 76/007
See application file for complete search history.

(56) References Cited

U.S. PATENT DOCUMENTS

| 7,644,144 B1 | 1/2010 | Horvitz et al. |
| 8,244,291 B2 | 8/2012 | Jorgensen |

(Continued)

FOREIGN PATENT DOCUMENTS

| WO | 2010140907 A1 | 12/2010 |
| WO | 2012149294 A1 | 11/2012 |

OTHER PUBLICATIONS

The International Search Report and the Written Opinion, SN: PCT/RU2014/000185, filed: Mar. 24, 2014, mailed: Dec. 1, 2014, all pages.

*Primary Examiner* — Barry Taylor (57) ABSTRACT

Dynamic location-based group formation is provided for a movable incident scene (MIS) in a wireless radio communication system comprising a plurality of first subscriber units. A controller receives, from a requesting device, a request for a new group call for a MIS. The controller receives an initial location associated with the MIS and an indication of a speed and direction of travel of the MIS, and then determines one or more potential future locations of the MIS. The controller identifies a set of one or more inclusion threshold rules for each of the one or more potential future locations, and forms a location-based group including first subscriber units meeting at least one inclusion threshold rule for any one of the one or more potential future locations. The controller causes audio and/or data transmitted by the requesting device to be provided to the first subscriber units in the formed group.

20 Claims, 5 Drawing Sheets

(51) Int. Cl.
*H04W 4/02* (2009.01)
*H04W 4/04* (2009.01)
*H04W 4/08* (2009.01)
*H04W 4/10* (2009.01)
*H04W 76/00* (2009.01)

(52) U.S. Cl.
CPC ............ *H04W 4/046* (2013.01); *H04W 4/08* (2013.01); *H04W 4/10* (2013.01); *H04W 76/005* (2013.01); *H04W 76/007* (2013.01)

(56) References Cited

U.S. PATENT DOCUMENTS

| | | |
|---|---|---|
| 8,483,651 B1 | 7/2013 | Zamora et al. |
| 2005/0113123 A1 | 5/2005 | Torvinen |
| 2005/0222752 A1 | 10/2005 | Sokola et al. |
| 2005/0233776 A1 | 10/2005 | Allen et al. |
| 2007/0201376 A1* | 8/2007 | Marshall-Wilson .... H04L 45/00 370/252 |
| 2007/0202908 A1* | 8/2007 | Shaffer ................ H04W 4/021 455/518 |
| 2007/0208492 A1 | 9/2007 | Downs et al. |
| 2007/0239824 A1 | 10/2007 | Shaffer et al. |
| 2009/0054077 A1 | 2/2009 | Gauthier et al. |
| 2009/0264106 A1 | 10/2009 | Mo et al. |
| 2010/0305851 A1* | 12/2010 | Meyer .................... G01C 21/32 701/532 |
| 2011/0117878 A1* | 5/2011 | Barash ............... G08B 21/0211 455/404.2 |
| 2011/0241935 A1* | 10/2011 | Miocinovic ............ G01C 21/30 342/357.31 |
| 2012/0209517 A1 | 8/2012 | Li et al. |
| 2012/0225636 A1 | 9/2012 | Ernst et al. |
| 2012/0265867 A1 | 10/2012 | Boucher et al. |
| 2013/0065628 A1* | 3/2013 | Pfeffer ................. G08B 25/006 455/521 |
| 2013/0271324 A1 | 10/2013 | Sendonaris et al. |
| 2013/0288692 A1* | 10/2013 | Dupray ................ H04W 64/00 455/450 |
| 2014/0057645 A1 | 2/2014 | Chowdhary et al. |

* cited by examiner

FIG. 1

--PRIOR ART--

METHOD AND APPARATUS FOR DYNAMIC LOCATION-BASED GROUP FORMATION FOR A MOVABLE INCIDENT SCENE

This application is a National Stage filing under 35 USC §371 of co-pending Patent Cooperation Treaty international application having Serial No. PCT/RU2014/000186 (the 'PCT international application') filed on Mar. 24, 2014. This application claims priority to the PCT international application, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber units.' At least one other terminal, e.g. used in conjunction with subscriber units (SUs), may be a fixed terminal, e.g. a base station, eNodeB, repeater, and/or access point. Such a RAN typically includes a system infrastructure that generally includes a network of various fixed terminals, which are in direct radio communication with the SUs. Each of the fixed terminals operating in the RAN may have one or more transceivers which may, for example, serve SUs in a given region or area, known as a 'cell' or 'site', by radio frequency (RF) communication. The SUs that are in direct communication with a particular fixed terminal are said to be served by the fixed terminal. In one example, all radio communications to and from each SU within the RAN are made via respective serving fixed terminals. Sites of neighboring fixed terminals may be offset from one another and may be non-overlapping or partially or fully overlapping with one another. In another example, SUs may communicate within a network without the assistance of one or more infrastructure equipment (e.g., base stations or repeaters), in a mode called direct mode. For example, in direct mode, SUs may transmit asynchronously and SUs s within range of the transmission synchronize themselves to that transmission for the purposes of receiving the transmission, but any transmissions in response to or after the first transmission are transmitted asynchronously.

RANs may operate according to any one of a number of available industry standard protocols such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the Terrestrial Trunked Radio (TETRA) standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber units in RANs such as those set forth above send and receive audio and/or data (e.g., encoded voice, audio, video, control information, data, and/or audio/video streams) in accordance with the designated protocol.

OMA-PoC, in particular, enables familiar PTT and "instant on" features of traditional half duplex SUs, but uses SUs operating over modern cellular telecommunications networks. Using PoC, SUs such as mobile telephones and notebook computers can function as PTT half-duplex SUs for transmitting and receiving auditory data. Other types of PTT models and multimedia call models (MMCMs) are also available.

Floor control in an OMA-PoC session is generally maintained by a PTT server that controls communications between two or more SUs. When a user of one of the SUs keys a PTT button, a request for permission to speak in the OMA-PoC session is transmitted from the user's SU to the PTT server using, for example, a real-time transport protocol (RTP) message. If no other users are currently speaking in the PoC session, an acceptance message is transmitted back to the user's SU and the user can then speak into a microphone of the SU. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the received auditory data packets to other users of the PoC session (e.g., to other SUs in the group of SUs or talkgroup to which the user is subscribed), using for example a unicast, multicast, or broadcast communication technique.

Narrowband LMR systems, on the other hand, operate in either a conventional or trunked configuration. In either configuration, a plurality of SUs are partitioned into separate groups of SUs. In a conventional system, each SU in a group is selected to a particular frequency for communications associated with that SU's group. Thus, each group is served by one channel, and multiple groups may share the same single frequency (in which case, in some embodiments, group IDs may be present in the group data to distinguish between groups using the same shared frequency). Communications in a conventional system may take place via an infrastructure-provided repeater or repeaters, or directly via a direct mode (including talk-around) protocol.

In contrast, a trunked radio system and its SUs use a pool of traffic channels for virtually an unlimited number of groups of SUs (e.g., talkgroups). Thus, all groups are served by all channels. The trunked radio system works to take advantage of the probability that not all groups need a traffic channel for communication at the same time. When a member of a group requests a call on a control or rest channel on which all of the SUs in the system idle awaiting new call notifications, in one embodiment, a call controller assigns a separate traffic channel for the requested group call, and all group members move from the assigned control or rest channel to the assigned traffic channel for the group call. Communications then take place via the assigned traffic channel repeater. In another embodiment, when a member of a group requests a call on a control or rest channel, the call controller may convert the control or rest channel on which the SUs were idling to a traffic channel for the call, and instruct all SUs that are not participating in the new call to move to a newly assigned control or rest channel selected from the pool of available channels. With a given number of channels, a much greater number of groups can be accommodated in a trunked system as compared with conventional radio systems. In a trunked system, communications may also take place directly between SUs when operating in a talk-around mode (e.g. direct mode when infrastructure devices are also available).

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a radio controller, call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., SUs) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, SUs may dynamically affiliate with a group (and also disassociate with the group) perhaps based on user input, and the switching and/or radio network may track group membership and route new group calls according to the current group membership. In some instances, a group of SUs may be identified as a talkgroup, and a call initiated to members of that talkgroup (whether including the transmission of audio and/or data and/or video to a group of target SUs) may be a identified as a talkgroup call.

One problem that has arisen with the use of talkgroups to distribute auditory or other data to member SUs is that a situation may arise where an incident occurs or a response is otherwise required at a movable location, and a responder may wish to dynamically create a location-based talkgroup relative to that movable location so that responding personnel may communicate with one another and coordinate a response and/or intercept between them. For example, a movable location may refer to a suspect or victim who is moving on foot or via motor vehicle and a responder may wish to create a location-based talkgroup for use in tracking or intercepting the suspect or victim, among other possibilities. Existing methods of dynamically creating such a location-based talkgroup have relied upon pre-configured static distances from the initially defined location (such as the location of the criminal action or injury) to determine which responding personnel (and corresponding SUs) should be included in the location-based talkgroup.

Figure 1:
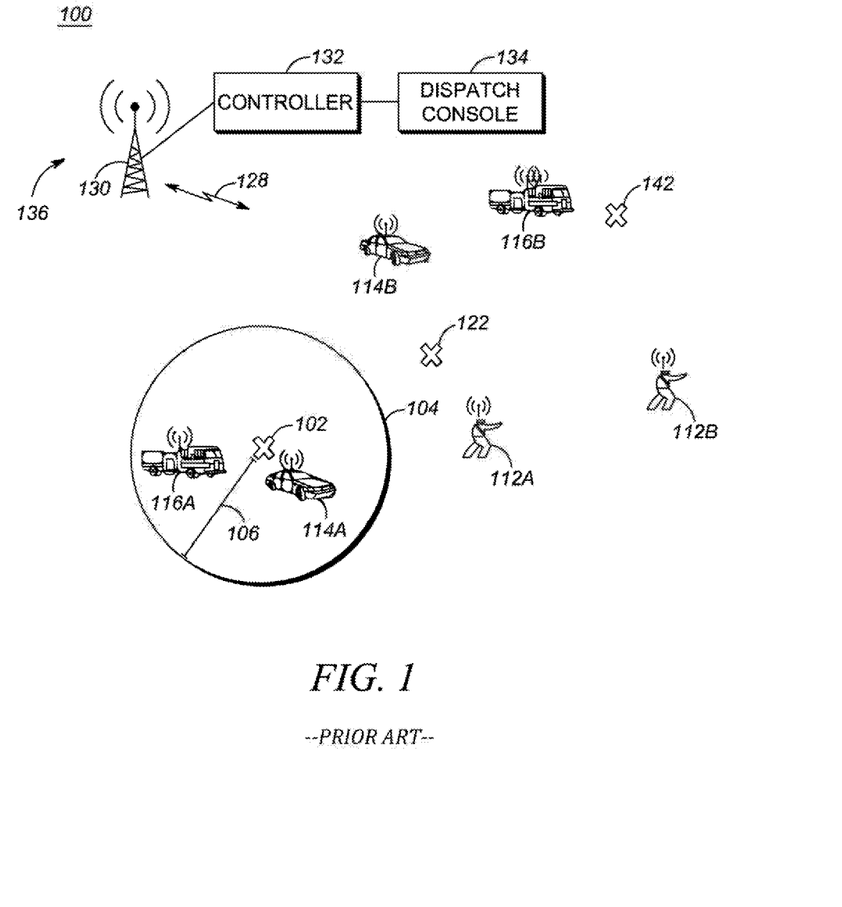
FIG. 1 is a schematic diagram of an existing incident/response area illustrating issues that may arise when creating location-based groups for a movable incident scene.

For example, as shown in FIG. 1, an incident/response area 100 may include a movable incident scene that begins at an initial defined location 102, and then moves to a first subsequent location 122, and then moves to a second subsequent location 142. The movable incident scene may be associated with, for example, a suspect that is involved in an initial transgression at initial defined location 102, and then moves away from the initial defined location 102 on foot or in a motor vehicle to the subsequent locations 122, 142.

The initial defined location 102 may be reported by a responder on scene or set by a dispatcher at a dispatch console 134, and, as is known, may be assigned a response boundary 104 statically defined at a fixed distance 106 from the initial defined location 102. Various potential responding SUs (each of which may also already be a member of a corresponding incident response group, such as police, fire, or traffic control) may already be on scene or within the response boundary 104 at the time of the incident. Each potential responder may be a person or vehicle with an associated SU (e.g., portable or vehicular SU) capable of communicating wirelessly with each other and/or with a RAN 136. Such potential responding SUs may include, for example, a motor vehicle potential responding SU 114A (e.g., police car) and a motor vehicle potential responding SU 116A (e.g., fire engine). Other potential responding SUs may fall within incident/response area 100 but outside of the response boundary 104, including for example, pedestrian potential responding SUs 112A and 112B, motor vehicle potential responding SU 114B, and motor vehicle potential responding SU 116B.

Each of the potential responding SUs may, in one example, already be actively using RF resources 128 of the RAN 136, which may be a LMR or LTE RAN providing coverage substantially throughout the incident/response area 100, illustrated in FIG. 1 as including a single fixed terminal 130 coupled to a controller 132 (e.g., radio controller, call controller, PTT server, zone controller, MME, BSC, MSC, site controller, Push-to-Talk controller, or other network device) and via the controller 132, to a dispatch console 134.

As illustrated in FIG. 1, using the statically defined response boundary 104 to dynamically set a location-based group membership for an incident or response required at or near the initial defined location 102 may cause some potential responding SUs (motor vehicle SUs 114A and 116A, in this example) to be included in the location-based group, but may fail to include some potential responding SUs in the location-based group that should be, perhaps based on an anticipated or predicted movement of the movable incident scene to subsequent locations 122, 142. Pedestrian potential responding SUs 112A, 112B, motor vehicle SU 114B, and/or motor vehicle SU 116B, for example, may be capable of intercepting or otherwise responding to the movable incident scene at or near subsequent locations 122 and/or 142, but in existing systems, they are not included in the location-based group.

Accordingly, for this and other reasons, there is a need for an improved method and apparatus for dynamically forming location-based groups for movable incident scenes so that incident and other types of response groups can be created more efficiently and can collaborate and coordinate a response to a moving incident scene more effectively.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for dynamically forming location-based groups for movable incident scenes so that incident and other types of response groups can be created more efficiently and can collaborate and coordinate a response to a moving incident scene more effectively.

In one embodiment, dynamic location-based group formation is provided for a movable incident scene in a wireless radio communication system comprising a plurality of first subscriber units. A controller receives, from one of a second subscriber unit and a dispatch console, a request for a new group call for a movable incident scene. The controller also receives an initial location associated with the movable incident scene and an indication of a speed and direction of travel associated with the movable incident scene. The controller determines, as a function of the initial location and the indication of the speed and direction of travel associated with the movable incident scene, one or more potential future locations of the movable incident scene different from the initial location, and identifies a set of one or more inclusion threshold rules for each of the one or more potential future locations. The controller then forms a location-based group including first subscriber units meeting at least one inclusion threshold rule in the respective identified set of inclusion threshold rules for any one of the one or more potential future locations. Once formed, the controller causes one or more of audio and data transmitted by the one of the second subscriber unit and the dispatch console to be provided to the first subscriber units in the formed group.

In another embodiment, a controller for providing dynamic location-based group formation for a movable incident scene includes a transceiver, a data store, and one or more processors configured to: receive, via the transceiver and from one of a second subscriber unit and a dispatch console, a request for a new group call for a movable incident scene; receive, via the transceiver, an initial location associated with the movable incident scene and an indication of a speed and direction of travel associated with the movable incident scene; determine, as a function of the initial location and the indication of the speed and direction of travel associated with the movable incident scene, one or more potential future locations of the movable incident scene different from the initial location; identify a set of one or more inclusion threshold rules for each of the one or more potential future locations; form, by the controller, a location-based group including first subscriber units meeting at least one inclusion threshold rule in the respective identified set of inclusion threshold rules for any one of the one or more potential future locations; and cause, via the transceiver, one or more of audio and data transmitted by the one of the second subscriber unit and the dispatch console to be provided to the first subscriber units in the formed group.

Each of the above-mentioned embodiments will be discussed in more detail below, starting with example incident/response area schematic diagrams of areas in which the embodiments may be practiced, followed by an illustration of devices and processing steps for supporting dynamic location-based group formation for movable incident scenes from an infrastructure controller device perspective. Further advantages and features consistent with this disclosure will be set forth in the following detailed description, with reference to the figures.

Figure 2:
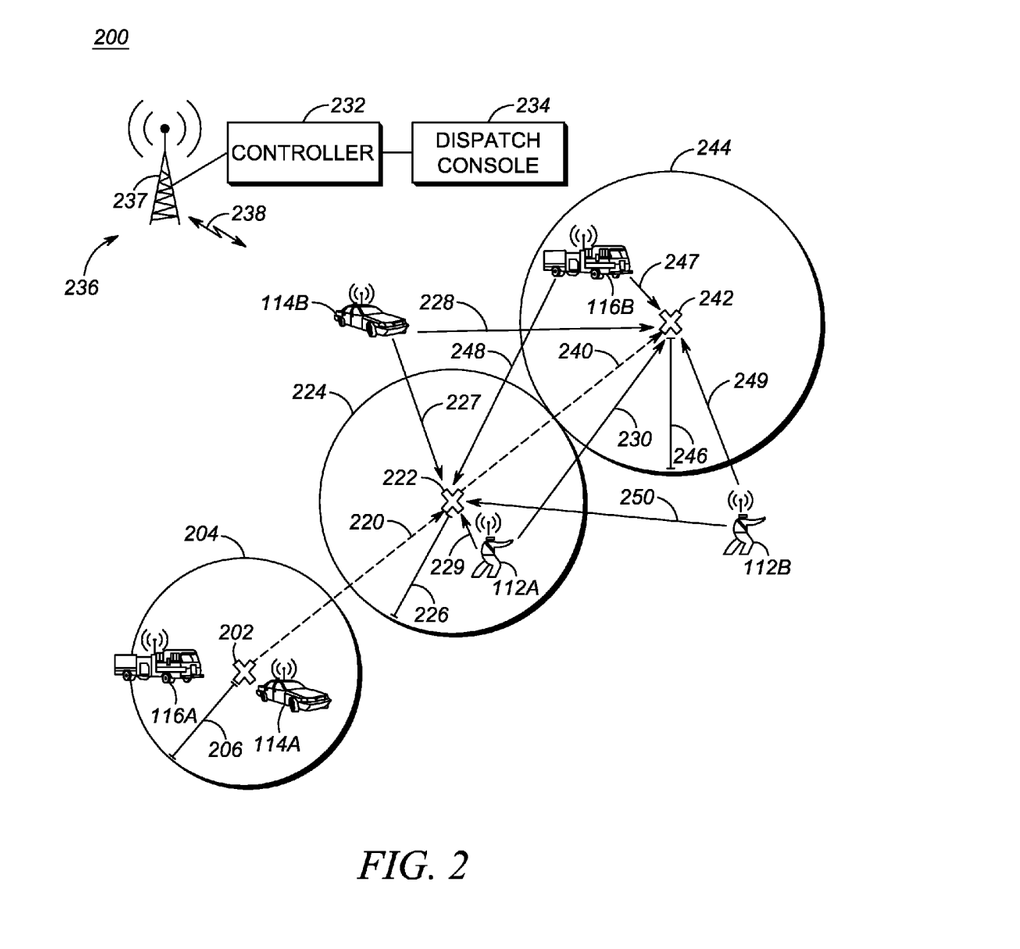
FIG. 2 is a schematic diagram of a first incident/response area illustrating dynamic location-based group formation for movable incident scenes in accordance with an embodiment.
Figure 3:
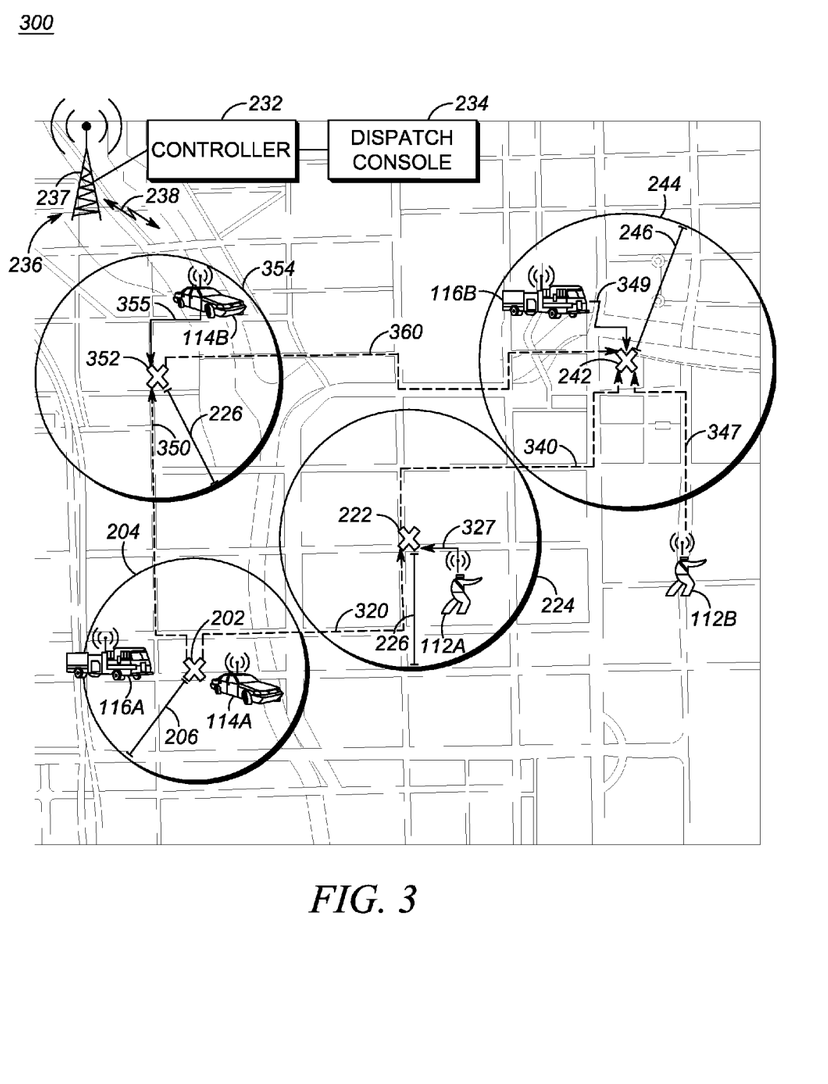
FIG. 3 is a schematic diagram of a second incident/response area illustrating dynamic location-based group formation for movable incident scenes in accordance with a further embodiment.

1. Example Incident/Response Areas and Location-Based Group Membership Determinations for Movable Incident Scenes FIGS. 2 and 3 are schematic diagrams of first and second incident/response areas illustrating dynamic location-based group formation for movable incident scenes in accordance with several embodiments. Where similar reference characters are used across FIGS. 2 and 3, their description is not repeated, but is intended to equally apply to the other figures in which they appear. While FIGS. 2 and 3 illustrate a single radio access network (RAN), single fixed terminal, single radio-frequency (RF) resource, a particular arrangement and quantity of initial and subsequent locations, and a particular arrangement, quantity, and types of potential responders (and their associated SUs), such illustrations are exemplary in nature only, and in other embodiments, different arrangements and quantities of elements may be employed.

FIG. 2, in particular, illustrates an example first incident/response area 200 including a RAN 236, an initial defined location 202 associated with a movable incident scene, movable incident scene potential (e.g., predicted) future locations 222, 242, and a plurality of potential responding SUs 112A, 112B, 114A, 114B, 116A, and 116B. The movable incident scene may again, for example, be related to an identified suspect of a crime and/or someone or something related to an identified suspect, to a victim of a crime and/or someone or something related to an identified suspect, to a motor vehicle that presents a hazard to its surroundings, or any other location, person, or thing that is movable but at which a response or intercept is required.

The wireless resource 238 may be, for example, one or more wireless links supporting a standard or protocol such as GPRS or UMTS, 2G (e.g. GSM), 3G (e.g. WCDMA or Long Term Evolution (LTE)), 4G (WiMAX or LTE), iDEN, wireless LAN (WLAN), ETSI Digital Mobile Radio (DMR), Project 25 (P25) standard defined by the Association of Public Safety Communications Officials International (APCO), Terrestrial Trunked Radio (TETRA), or other radio protocols or standards.

Each potential responding SU may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture provided via RAN 236 allows a single responding SU, such as responding SU 114A, to communicate with one or more members associated with a dynamically formed location-based talkgroup at the same time.

Although only one controller 232 is illustrated in FIG. 2, a distributed controller may be used that divides functions across multiple devices, perhaps for load balancing reasons. Controller 232 may additionally function as a call controller, PTT server, zone controller, mobile management entity (MME), base station controller (BSC), mobile switching center (MSC), site controller, Push-to-Talk controller, or other network device for aiding in the control and/or distribution of group auditory data or other types of group communications amongst responding SUs. Finally, and although not illustrated in FIG. 2, RAN 236 may further comprise one or more additional routers, switches, LANs, WLANs, WANs, access points, or other network infrastructure.

External networks (not shown) may also be accessible to potential responding SUs and dispatch console 234 via RAN 236. External networks may include, for example, a public switched telephone network (PSTN), a plain old telephone system (POTS), the Internet, or another wireless service provider's network, among other possibilities.

Dispatch console 234 may be directly coupled to controller 232, as shown, or may be indirectly coupled to controller 232 via one or more internal or externals networks. The dispatch console 234 allows an administrator or dispatcher at the dispatch console 234 to initiate infrastructure-sourced dynamic location-based group communications to groups of responding SUs relative to a movable incident scene indicated by the dispatcher, among other features and functions.

RAN 236 in FIG. 2, similar to FIG. 1, provides wireless communications services to all potential responding SUs in the incident/response area 200 via fixed terminal 237 and wireless resource 238. RAN 236 provides a communications path between controller 232 and potential responding SUs in the incident/response area 200, among other provided functions and services.

The initial defined location 202 of the movable incident scene is provided to the controller 232 and may be entered in or reported manually by a first responder on-scene (for example, motor vehicle potential responding SU 114A in FIG. 2), could be automatically determined by a determined location of some other responding SU that is at the initial defined location 202 (not illustrated in FIG. 2), or could be set by a dispatcher at a dispatch console 234 communicatively coupled to the controller 232 (e.g., after receiving a report from a potential responding SU or via some other mechanism, such as a POTS system call received at the dispatch console 234). In other examples, the initial defined location 202 could be provided to the controller 232, directly or indirectly, by the movable incident scene itself such as, for example, by a reported GPS location or triangulated position of a mobile phone associated with a person or vehicle defining the movable incident scene, or by a reported GPS location or triangulated position of a tracking device associated with a person or vehicle defining the movable incident scene. In still further embodiments, a plurality of fixed terminals (not shown) in the radio access network 236 may be used to determine a location, by the infrastructure and using triangulation of a signal emitted from a mobile device, tracking device, or other wireless transmitter defining or associated with the movable incident scene, of the movable incident scene.

In addition to the initial defined location 202 of the movable incident scene, indication(s) of a speed and direction of travel of the movable incident scene is obtained by, and/or provided to, the controller 232. For example, a speed and direction of travel of the movable incident scene may be entered in or reported manually by a first responder on-scene (again, for example, by motor vehicle potential responding SU 114A in FIG. 2), could be automatically determined by a determined or reported speed and direction of travel of a responding SU that is associated with the movable incident scene (e.g., a police car tailing a suspect in a motor vehicle or a pedestrian officer chasing a suspect on foot, for example), or could be set by a dispatcher at a dispatch console 234 communicatively coupled to the controller 232 (e.g., after receiving a report from a potential responding SU or via some other mechanism, such as a POTS system call received at the dispatch console 234, indicating an estimated or actual speed and direction of travel of the movable incident scene). In other examples, the indication of speed and direction of travel of the movable incident scene could be in the form of a plurality of reported sequential GPS locations or triangulated positions of a mobile phone or other wireless device defining or associated with the movable incident scene (from which the controller may extract and/or determine speed and direction information from using a time different between the location determination, such as times of receipt or location messages or differences in time stamps of the initial location determination), or by a plurality of reported sequential GPS locations or triangulated positions of a potential responding SU associated with the movable incident scene (again, from which the controller may extract and/or determine speed and direction information from using location and time differences). In still further embodiments, a plurality of fixed terminals in the radio access network 236 may be used to determine a plurality of locations, by the infrastructure and using triangulation of a signal emitted from a mobile device or other wireless transmitter associated with the movable incident scene, of the movable incident scene or a device associated with the movable incident scene, from which the controller may similarly extract and/or determine speed and direction information. In some embodiments, the initial location and a single subsequent location of the movable incident scene may be sufficient for the controller to determine a speed and direction of travel. In other embodiments, a minimum threshold plurality of locations (e.g., more than two) of the movable incident scene may be obtained prior to estimating a speed and direction of travel of the movable incident scene.

In still another embodiment, movement sensors (such as an accelerometer, magnetometer, and/or gyroscope) may be provided on the movable incident scene or a device associated with the movable incident scene, and sensor information provided to the controller 232 as indications of speed and/or direction, perhaps accompanying other information, allowing the controller to determine the speed and direction of movement of the movable incident scene. An accelerometer is a device that measures acceleration. Single- and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well.

Once the controller 232 has information including the initial defined location 202 of the movable incident scene and an indication of a speed and direction of movement of the movable incident scene, the controller can calculate one or more predicted (e.g., potential) future locations of the movable incident scene using a pre-configured algorithm or algorithms pre-configured at the controller and/or identified by a dispatcher or potential responding SU in the field. For example, the algorithm may use the determined initial defined location and known speed and direction of movement of the movable incident scene to extrapolate future locations of the movable incident scene at time increments such as 1, 5, 10, 15, and/or 30 minute increments, or at similar integer or decimal increments. In other embodiments, the algorithm may use the determined initial defined location and known speed and direction of movement of the movable incident scene to extrapolate future locations of the movable incident scene at distance increments such as 1, 5, 10, 15, and/or 30 mile increments, or at similar integer or decimal increments. Increment values and the number of potential future locations to consider could be pre-configured at the controller 232, or specified by a dispatcher via dispatch console 234 or specified by a potential responding SU, such as by the initiator of the request for the location-based group call.

In the example set forth in FIG. 2, the movable incident scene identified initially at defined location 202 and whose speed and direction of travel is reported to or otherwise determined by controller 232, is predicted to move along path 220 to a first potential future location 222 and then along path 240 to second potential future location 242. While in this example, only two potential future locations are illustrated and both are along a same or similar path, in other examples, more than two potential future locations could be predicted by the controller 232, and potential future locations may occur across a combination of various parallel and/or serial paths, as will be explained in more detail with respect to FIG. 3 below. The potential future locations 222, 242 could be set using pre-configured intervals set at the controller 232, or via some other method. For example, first potential future location 222 may be set 5 miles or 10 minutes away from (given the known speed and direction of travel of the movable incident scene) the initial location 202, and second potential future location 242 may be set 5 miles or 10 minutes away from (given the known speed and direction of travel of the movable incident scene) the initial defined location 222.

Once one or more potential future locations are identified by the controller 232, the controller 232 identifies a set of one or more inclusion threshold rules for each of the one or more potential future locations. The set of inclusion threshold rules for each of the one or more potential future locations determines which, if any, potential responding SUs in incident/response area 200 should be included in a location-based response group for the movable incident scene. Same or different sets of inclusion threshold rules could be applied to each of the one or more potential future locations.

For example, an inclusion threshold rule in the set of rules associated with a particular potential future location may identify potential responding SUs having current locations that fall within a maximum response distance associated with and relative to the particular potential future location. Same or different maximum response distances may be associated with each of the one or more potential future locations of the movable incident scene. For example, in some embodiments, the maximum response distance is increased as a distance between the initial defined location and the particular potential future location is increased. Furthermore, even for a same potential future location, different maximum response distances may be applied depending on a type of responder for responding to the potential future location. For example, a first maximum distance criterion may be applied at the particular potential future location for potential responding SUs associated with a pedestrian mode of transport, a second larger maximum distance criterion may be applied at the particular potential future location for potential responding SUs associated with a human-powered vehicle mode of transport (e.g., bicycle), and a third still larger maximum distance criterion may be applied at the particular potential future location for potential responding SUs associated with a motor vehicle mode of transport. Each of the applied first, second, and third maximum distance criterions may similarly get larger as the distance between the initial defined location and the particular potential future location increases.

Controller 232 may also store, or have access to, current location information for each of the potential responding SUs in the incident/response area 200. Current location information may be determined by each responding SU independently using a Global Navigation Satellite System receiver such as a GPS receiver or using a trilateration technique via signals received from a plurality of ground-based fixed terminals and then reported to a location server (at the controller 232 or elsewhere internal or external to the RAN 236) on a regular or intermittent schedule. Additionally or alternatively, an infrastructure-based location determination may be implemented using same or similar trilateration techniques via signals received from the potential responding SU at a plurality of ground-based fixed terminals. Still further, the current location of each of the SUs may be requested in response to receiving the request for a new location-based group call for a movable incident scene. This may include, for example, the controller causing requests for current location information to be transmitted to each of the potential responding SUs and subsequently receiving, in response, current location information from each of the potential responding SUs. Other possibilities exist as well.

The controller 232 may determine or have access to current location information for all potential responding SUs active and/or known to the controller 232, a subset of all potential responding SUs active and/or known to the controller 232 including those currently registered with one or more RANs providing wireless service at the initial or potential future locations or in a threshold maximum region surrounding the initial or potential future locations such as 1-5 miles, a subset of all potential responding SUs active and/or known to the controller 232 including only those that are not already active in another call or otherwise determined to be busy, for example, or a subset of all potential responding SUs active and/or known to the controller 232 that are particularly identified as available for participating in dynamically created location-based talkgroups, among other possibilities.

FIG. 2 illustrates an example application of maximum distance inclusion threshold rules to first and second potential future locations 222 and 242. In particular, a first perimeter 224 is defined at a distance 226 from the first potential future location 222 and a second perimeter 244 is defined at a distance 246 from the second potential future location 242. While each of the perimeters 224, 244 are illustrated as circles centered on their respective potential future location, in other embodiments, the perimeters may be based on some other form of cartographic definition, such as a set of three or more polygon vertices, where each polygon vertex is a GPS coordinate, such as a latitude and longitude pair, or some other form of cartographic definition, having a center at the defined location or slightly offset from the defined location. Other examples are possible as well.

As illustrated in FIG. 2, pedestrian potential responding SU 112A falls within perimeter 224 and motor vehicle potential responding SU 116B falls within perimeter 244, thus meeting the respective distance-based inclusion threshold rules for the first and second potential future locations 222 and 242. Assuming that motor vehicle potential responding SU 114A is the initiating/requesting device requesting, itself or via dispatch console 234, a location-based group call be initiated for a movable incident scene associated with initial defined location 202, the controller 232 would create a location-based group including motor vehicle potential responding SU 114A as the initiator/requestor SU, pedestrian potential responding SU 112A as meeting the respective distance-based inclusion threshold rule for first potential future location 222, and motor vehicle potential responding SU 116B as meeting the respective distance-based inclusion threshold rule for second potential future location 242.

In some embodiments, the controller 232 may cause to be transmitted an instruction (such as a text message, control signal, and/or location indication) to each potential responding SU meeting a respective distance-based inclusion threshold rule for a particular potential future location that instructs the potential responding SU to travel to the determined one of the potential future locations with which they met the inclusion threshold rule. For example, in this case, the controller 232 may cause to be transmitted an instruction to pedestrian potential responding SU 112A meeting the respective distance-based inclusion threshold rule for first potential future location 222 to proceed to the first potential future location 222 to intercept the movable incident scene.

In those situations where a potential responding SU has a current location falling within more than one perimeter associated with more than one potential future location, the controller 232 may include the potential responding SU in the location-based group, and may also make a further determination of which potential future location the potential responding SU could arrive at first (e.g., lowest absolute arrival time) or arrive at quickest (e.g., lowest overall travel time) from its current location and transmit an instruction (such as a text message, control signal, and/or location indication) instructing the potential responding SU to travel to the determined one of the potential future locations. For example, assuming the current time is 10:00, and a potential responding SU could respond at a potential future location A of the movable incident scene at 10:10 (e.g., 10 minute travel time to arrive to location A) and could also respond at a potential future location B of the movable incident scene at 10:05 (e.g., 5 minute travel time to location B), and where the movable incident is estimated to arrive at location A at 10:15 and location B at 10:20, in some embodiments, the earlier interception time/absolute arrival time would be preferred at potential future location A (10:10), even though it would take the potential responding SU longer to travel to that location. In other embodiments, the lower travel time could be preferred at potential future location B (10:05), even though the movable incident scene isn't actually predicted to arrive there until 10:20. Other possibilities exist as well.

In addition to the set(s) of inclusion threshold rules applied to the one or more potential future locations 222, 242, a same or different set of inclusion threshold rules could also be applied to the initial defined location 202 for identifying potential responding SUs for inclusion in the location-based group for responding to the movable incident scene. For example, the set of inclusion threshold rules for the initial defined location 202 may include a distance-based inclusion threshold rule that considers potential responding SUs having current locations that fall within a maximum response distance associated with and relative to the initial defined location 202 of the movable incident scene. For example, and with respect to FIG. 2, a third perimeter 204 is defined at a distance 206 from the initial defined location 202 formed via a same or similar manner as the first and second perimeters 224 and 244 set forth above.

As illustrated in FIG. 2, motor vehicle potential responding SU 116A falls within perimeter 204, thus meeting the respective inclusion threshold rule for the initial defined location 202. Assuming that motor vehicle potential responding SU 114A was the initiating/requesting device requesting, itself or via dispatch console 234, a location-based group call be initiated for a movable incident scene associated with initial defined location 202, the controller 232 would create a location-based group including motor vehicle potential responding SUs 114A and 116A, pedestrian potential responding SU 112A, and motor vehicle potential responding SU 116B.

In embodiments in which the initial defined location 202 is not considered in determining which potential responding SUs to add to the location-based group, individual responding SUs, such as a location-based group call requesting SU that may not meet the inclusion threshold rule(s) for any one or more of the potential future locations may still be added to the location-based group by the controller 232. Of course, a dispatcher operating dispatch console 232 could further manually add additional potential responding SUs to the location-based group for the movable incident scene automatically created by controller 232.

In another embodiment, an inclusion threshold rule in the set of rules associated with a particular potential future location may identify potential responding SUs having an estimated arrival time $T_{ssu}$ at the particular potential future location that occurs earlier than an estimated arrival time $T_{is}$ of the movable incident scene at the particular potential future location. For example, and with respect to FIG. 2, an estimated arrival time $T_{is1}$ of the movable incident scene at first potential future location 222 and an estimated arrival time $T_{is2}$ of the movable incident scene at second potential future location 242 could be determined by the controller 232 using the initial defined location 202 and the determined direction and speed of the movable incident scene. The estimated arrival times $T_{is1}$ and $T_{is2}$ could be an amount of travel time remaining until the movable incident scene arrives at each respective potential future location 222, 242, and could decrement as time moves forward, or could take the form of an absolute arrival time for each location, among other possibilities. Therefore, a comparison of estimated arrival times could involve comparing absolute arrival times of potential responding SUs and the movable incident scene to determine which occurs earlier than the other, or comparing travel times of potential responding SUs and the movable incident scene to determine which is smaller (and thus earlier) than the other.

Once the estimated arrival times of the movable incident at each of the one or more potential future locations is known, arrival times for each of the potential responding SUs in the incident/response area 200 can be calculated relative to each of the potential future locations. Arrival times for each of the potential responding SUs could be based on a current location and mode of transport associated with each potential responding SU, on a current location and determined instantaneous or average velocity of each potential responding SU, or via some other mechanism. For example, and with respect to FIG. 2, estimated arrival times $T_{ssu}$ 227 and $T_{ssu}$ 228 of the motor vehicle potential responding SU 114B at each of the first potential future location 222 and second potential future location 242, based on its current location and one or more of its mode of transport and average or instantaneous detected velocity, could be determined by the controller 232 or otherwise provided to the controller 232 via some other infrastructure device. Similarly, estimated arrival times $T_{ssu}$ 229 and $T_{ssu}$ 230 of the pedestrian potential responding SU 112A at each of the first potential future location 222 and second potential future location 242, based on its current location and one or more of its mode of transport and average or instantaneous detected velocity, could be determined by the controller 232 or otherwise provided to the controller 232 via some other infrastructure device. Estimated arrival times $T_{ssu}$ 247 and $T_{ssu}$ 248 of the motor vehicle potential responding SU 116B and estimated arrival times $T_{ssu}$ 249 and $T_{ssu}$ 250 of the pedestrian potential responding SU 112B could be similarly determined.

In one embodiment, a plurality of reported locations for a potential responding SU may be used by the controller 232 to determine an average or instantaneous speed associated with that potential responding SU and/or a direction of travel of the potential responding SU, and the controller 232 may use such information directly to determine an ability to meet an arrival time inclusion threshold rule or may use such information indirectly in determining a mode of transport associated with the potential responding SU (which may then be used to determine an ability to meet an arrival time inclusion threshold rule).

In some embodiments, mode of transport information may be obtained by the controller 232 via a potential responding SU ID to mode of transport mapping stored at the controller 232 or made available to the controller at some other device located within the RAN 236 or external to the RAN 236. Once the mode of transport information is retrieved for each of the potential responding SUs, average or maximum speed capability information associated with each mode of transport may be retrieved via a mode of transport to speed mapping. Once the speed capability information and current location information is known for a potential responding SU, the controller 232 can determine an estimated arrival time for the potential responding SU to each of the potential future locations fur use in determining whether the potential responding SU meets the arrival-time-based inclusion threshold rule for any one or more potential future locations.

In some embodiments, updates to a mode of transport may be received at the controller 232 from a potential responding SU that changes a mode of transport associated with the potential responding SU from one mode of transport to another different mode of transport. The controller 232 may responsively update the mapping at the controller 232 itself or cause an update to be made at some other device located within the same RAN 236 as the controller or at some device external to the RAN 236 that stores the SU ID to mode of transport mapping for the potential responding SU.

As set forth with respect to the estimated arrival times $T_{is1}$ and $T_{is2}$, the respective estimated arrival times $T_{ssu}$ of the potential responding SUs could similarly be an estimated travel time it would take for the potential responding SU to reach each respective potential future location 222, 242, or could take the form of an estimated absolute arrival time for each location, among other possibilities.

Once the estimated arrival times $T_{ssu}$ of each of the potential responding SUs in the incident/response area 200 for each determined potential future location of the movable incident scene are known, the controller 232 can compare them to the estimated arrival times of the movable incident scene (in this case, $T_{is1}$ and $T_{is2}$) and determine whether each of the potential responding SUs is capable of arriving at one or more of the potential future locations prior to or substantially at a same time as the movable incident scene. For example, assuming the current time is 10:00 pm, if the estimated arrival time $T_{is1}$ of the movable incident scene at the first potential future location 222 is 9 minutes from now (travel time) or 10:09 pm (absolute time) and the estimated arrival time $T_{is2}$ of the movable incident scene at the second potential future location 242 is 19 minutes from now (travel time) or 10:19 pm (absolute time), the controller may determine to include motor vehicle responder 114B in the location-based group if either one of its estimated arrival times $T_{ssu}$ 227 or 228 at the potential future locations 222, 242 occurs prior to (e.g., absolute time earlier than or travel time less than) the respective arrival time $T_{is1}$ or $T_{is2}$ of the movable incident scene at that same potential future location. In this case, if the motor vehicle potential responding SU 114B, based on its current location and its determined speed (average or instantaneous) or estimated speed (perhaps based on its associated mode of transport) is estimated by the controller to arrive at the first potential future location 222 prior to 10:09 pm or within 9 minutes, or if the motor vehicle potential responding SU 114B is estimated by the controller to arrive at the second potential future location 242 prior to 10:19 pm or within 19 minutes, the motor vehicle potential responding SU 114B would be included by the controller 232 in the location-based group for the movable incident scene. If, on the other hand, the motor vehicle responder 114B could arrive at neither the first nor second potential future locations 222, 242 within the respective arrival times $T_{is1}$ or $T_{is2}$ of the movable incident scene at those locations, the motor vehicle potential responding SU 114B would not be included by the controller 232 in the location-based group for the movable incident scene.

Same or similar considerations are made for the other potential responding SUs of FIG. 2, including pedestrian potential responding SUs 112A and 112B, and motor vehicle potential responding SU 116B.

In some embodiments, the controller 232 may cause to be transmitted an instruction (such as a text message, control signal, and/or location indication) to each potential responding SU meeting a respective arrival-time-based inclusion threshold rule for a particular potential future location that instructs the potential responding SU to travel to the determined one of the potential future locations with which they met the inclusion threshold rule. For example, in this case, the controller 232 may cause to be transmitted an instruction to be sent to motor vehicle potential responding SU 114B, assuming it meet the respective arrival-time-based inclusion threshold rule for first potential future location 222, to proceed to the first potential future location 222 to intercept the movable incident scene.

In those situations where a potential responding SU has determined estimated arrival times $T_{ssu}$ occurring before the incident scene's estimated arrival time $T_{is}$ for more than one potential future location, the controller 232 may include the potential responding SU in the location-based group, and may also make a further determination of which potential future location the potential responding SU could arrive at first (e.g., lowest absolute arrival time) or arrive at quickest (e.g., lowest overall travel time) from its current location and transmit an instruction (such as a text message, control signal, and/or location indication) instructing the potential responding SU to travel to the determined one of the potential future locations.

Furthermore, in calculating or otherwise determining the arrival time estimates $T_{is}$ and $T_{ssu}$ for the movable incident scene and/or potential responding SUs, the controller 232 may access additional information databases to aid in more accurately estimating such arrival times. For example, controller 232 may access current traffic conditions via a traffic server and modify the arrival time estimates for the potential responding SUs and/or movable incident scene up or down based on a respectively higher or lower detected amount of traffic within a particular incident/response area 200. Additionally or alternatively, the controller 232 may access weather conditions via a weather server and modify the arrival time estimates up or down based on the weather conditions retrieved from the weather server that may positively or negatively affect a speed that a pedestrian or vehicle could achieve (e.g., such as snow or icy conditions). A determined time of day, determined at the controller 232 or via an external time server device, may also cause estimated arrival times to vary (e.g., decrease during the day and increase at night, for example). Other examples are possible as well.

Of course, other types of inclusion threshold rules, alone or in combination with the above noted inclusion threshold rule examples, could be included in any one or more sets of inclusion threshold rules. Furthermore, and in some embodiments, if the speed and/or direction of the movable incident scene is detected to change significantly (e.g., greater than a pre-configured threshold difference) from an initial indication or calculation of the speed and direction of the movable incident scene, the one or more potential future locations could be recalculated and respective sets of inclusion threshold rules applied to the recalculated future locations. In some embodiments, additionally identified potential responding SUs relative to the recalculated potential future locations could be added to the location-based group for responding to the movable incident scene, while in other embodiments, an entirely new location-based group could be created using the recalculated potential future locations with or without including a new initial location (and corresponding set of one or more inclusion threshold rules) of the movable incident scene at or near the location where the change in speed and/or direction was detected.

FIG. 3 illustrates an example second incident/response area 300 including RAN 236, initial defined location 202 associated with a movable incident scene, movable incident scene predicted potential future locations 222, 242, 352, and the plurality of potential responding SUs 112A, 112B, 114A, 114B, 116A, and 116B.

FIG. 3, in particular, illustrates a variation of location-based group formation for a movable incident scene when the controller 232 has access to cartographic information from a cartographic database describing paths available to the movable incident scene. The cartographic database may be stored at the controller 232 or at a cartographic information system (CIS), accessible to the controller 232, and that is pre-configured with available motor vehicle, pedestrian paths, and/or other types of paths within a particular incident/response area 300. When available, the controller 232 may use such cartographic information in estimating potential future locations of the movable incident scene, and in determining or estimating arrival times for the movable incident scene and/or potential responding SUs at the determined potential future locations.

FIG. 3 illustrates, for example, that given a detected speed and direction of travel of the movable incident scene away from the initial defined location 202, the controller 232 may not know with certainty which of several available paths in the direction of travel that the movable incident scene will take. In some embodiments, the controller may not know with any degree of certainty when an intersection of paths (e.g., streets, sidewalks, etc.) occurs along a predicted direction of travel of the movable incident scene, which path or paths the movable incident scene will ultimately choose. In such embodiments, the controller 232, instead of determining a plurality of serial potential future locations of the movable incident scene, may instead determine multiple potential future locations along parallel paths, and create a location-based group for responding to the movable incident scene based on those parallel paths. As shown in FIG. 3, and based on the initial defined location 202 and a determined speed and direction of the movable incident scene, and also as a function of cartographic information describing the paths available to the movable incident scene, the controller 232 may determine that the movable incident scene may take either one of path 320 to first potential future location 222 (and on to second potential future location 242 via path 340), or may likely take path 350 to third potential future location 352 (and then on to the second potential future location 242 via path 360).

When creating a location-based group for responding to the movable incident scene, the controller 232 may apply the inclusion threshold rule to each of the potential future locations 222, 242, 352 along the parallel paths, even though the movable incident scene will actually only take one of the paths 320/340 or 350/360 towards the second potential future location 242. While the same distance 226 is illustrated as being applied for a distance-based inclusion threshold rule relative to potential future locations 222 and 352, in other embodiments, they may vary. In some embodiments, the controller 232 may determine a likelihood that the movable incident scene will take either one of path 320 or 350, and vary the distance 226 at each potential future location 222, 352 as a function of the likelihood, such that a higher likelihood results in a larger distance while a smaller likelihood results in a smaller distance.

While potential responding SU 114B would have been excluded from a location-based group created using distance-based inclusion threshold rules and serially placed potential future locations for the movable incident scene of FIG. 2 because it is located outside each of the perimeters 204, 224, and/or 244, when applying distance-based inclusion threshold rules to FIG. 3 with parallel paths from the initial defined location 202 to the second potential future location 242 (via parallel-placed first and third potential future locations 222, 352), the potential responding SU 114B would be included in a location-based group for the movable incident scene of FIG. 3 when a distance-based inclusion threshold rule is applied based on its location within perimeter 354 associated with the third potential future location 352.

As shown in FIG. 3, the controller 232 may further take cartographic information into account when determining paths 320, 340, 350, 360, and may take speed information (e.g., such as speed limit or average historical speed information) or other traffic information into account when calculating expected arrival times $T_{is}$ of the movable incident scene at respective potential future locations 222, 242, and 352. Additionally, the controller 232 may take cartographic information into account when determining expected arrival times $T_{ssu}$ of potential responding SUs in responding to respective potential future locations. While each potential responding SU in FIG. 3 112A, 112B, 114B, and 116B is illustrated in FIG. 3 with only a single expected arrival time $T_{ssu}$ for ease of illustration, as described above with respect to FIG. 2 the controller 232 would likely estimate arrival times from each potential responding SU to each of the potential future locations.

For example, the controller 232 may determine an estimated arrival time $T_{ssu}$ 355 for motor vehicle potential responding SU 114B to arrive at third potential future location 352 via the available paths set forth in the cartographic information retrieved from the CIS. If the estimated arrival time $T_{ssu}$ 355 (in view of the determined shortest or quickest cartographic path that the potential responding SU 114B would take to arrive at the third potential future location 352) is less than the estimated arrival time $T_{is}$ of the movable incident scene at the third potential future location 352 (in view of the predicted cartographic path that the movable incident scene would take to arrive at the third potential future location 352), the potential responding SU 114B would be included in the location-based group for responding to the movable incident scene. Similar considerations could be made for potential responding SU 112A (estimated arrival time $T_{ssu}$ 327 at first potential future location 222), potential responding SU 112B (estimated arrival time $T_{ssu}$ 347 at second potential future location 242), and potential responding SU 116B (estimated arrival time $T_{ssu}$ 349 at second potential future location 242).

Similar to the example set forth above with respect to FIG. 2, a distance-based inclusion threshed rule could be applied to the initial defined location 202 of FIG. 3 to determine whether potential responding SUs 114A and 116A (assuming neither is already included as being the initiator/requestor of the location-based group call) should be included in the location-based group for the movable incident scene.

Further use of cartographic information by the controller 232 could be made when applying distance-based inclusion threshold rules. For example, the controller 232 may use cartographic information retrieved from the CIS to vary the distances 206, 226, 246 from pre-configured or default values, perhaps based on a number or density of paths available to a particular potential responding SU within a perimeter, and/or based on other information noted above, such as current traffic or weather information.

2. Example Controller for Creating Dynamic Location-Based Groups for Movable Incident Scenes Referring to FIG. 4, a block diagram illustrates a controller 401, that may be the same or similar to controller 232 of FIGS. 2 and 3, that may be used in accordance with some embodiments for creating dynamic location-based groups for movable incident scenes. The controller 401 includes a communications unit 402 coupled to a common data and address bus 417 of a processing unit 403. The controller 401 may also include an input unit (e.g., keypad, pointing device, etc.) 406 and a display screen 405, each coupled to be in communication with the processing unit 403.

Figure 4:
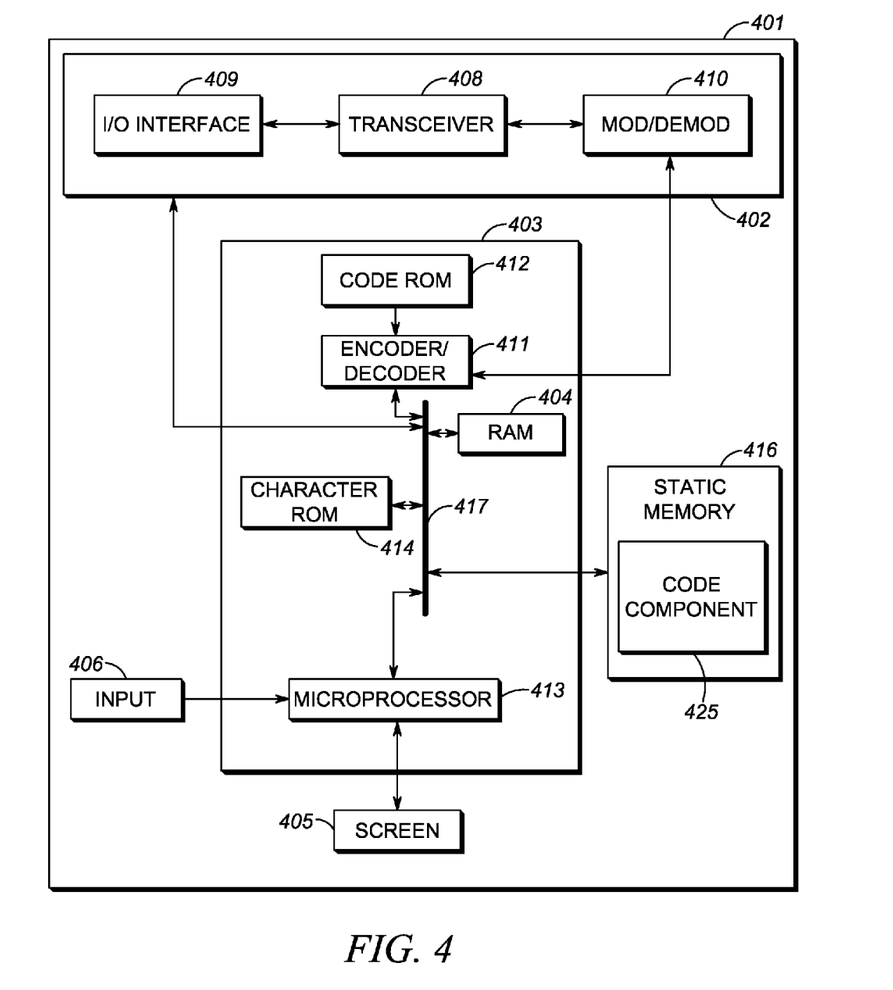
FIG. 4 is a block diagram of a controller device capable of dynamically forming location-based groups for movable incident scenes in accordance with an embodiment.

The processing unit 403 may include an encoder/decoder 411 with an associated code ROM 412 for storing data for encoding and decoding voice, data, control, or other signals that may be transmitted or received by the controller 401. The processing unit 403 may further include a microprocessor 413 coupled, by the common data and address bus 417, to the encoder/decoder 411, a character ROM 414, a RAM 404, and a static memory 416. The processing unit 403 may also have access to, via one or both of RAM 404 and static memory 416 or via I/O interface 409, among other things, (i) cartographic information relating to geographic areas in an incident/response area associated with the controller 401, (ii) distance criterions for applying to distance-based inclusion threshold rules, (iii) traffic condition information, (iv) weather condition information, and/or (v) current location information for each responding SU in the incident/response area associated with the controller 401.

The communications unit 402 may include the I/O interface 409 configurable to communicate with network components (for example, fixed terminals, call controllers, databases, or dispatch consoles, among other possibilities), and other user equipment (for example, responding SUs) communicatively coupled to the controller 401 via wireless resources. The communications unit 402 may include one or more broadband and/or narrowband transceivers 408, such as a LTE transceiver, a 3G transceiver, an APCO P25 transceiver, a DMR transceiver, a TETRA transceiver, a WiMAX transceiver, and/or other similar type of wireless transceiver configurable to communicate via a wireless network for infrastructure communications. Additionally or alternatively, the communications unit 402 may include one or more local area network or personal area network transceivers 408 such as a Wi-Fi transceiver perhaps operating in accordance with an IEEE 802.11 standard (e.g., 802.11a, 802.11b, 802.11g), or a Bluetooth transceiver, for SD to SD communications. Additionally or alternatively, the communications unit 402 may include one or more wire-line transceivers 408, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 410 that is coupled to the encoder/decoder 411. The character ROM 414 stores code for decoding or encoding data such as control, request, or instruction messages, audio and/or data that may be transmitted or received by the controller 401. Static memory 416 may store operating code that, when executed by microprocessor 413, causes the controller 401 to perform one or more of the processing steps and/or message transmissions and/or receptions set forth in FIG. 5.

3. Process for Creating Dynamic Location-Based Groups for Movable Incident Scenes FIG. 5 includes a flow chart illustrating a process 500 including processing steps executable at the controller 401 device of FIG. 4 and/or controller 232 device of FIGS. 2 and 3 for creating location-based groups for movable incident scenes in accordance with some embodiments. Of course, additional steps, receptions, and/or transmissions not disclosed herein could be additionally added before, after, or in-between steps, receptions, and/or transmissions disclosed in FIG. 5, and the presence of such additional steps, receptions, and/or transmissions would not negate the purpose and advantages of the examples set forth in detail throughout the remainder of this disclosure.

Figure 5:
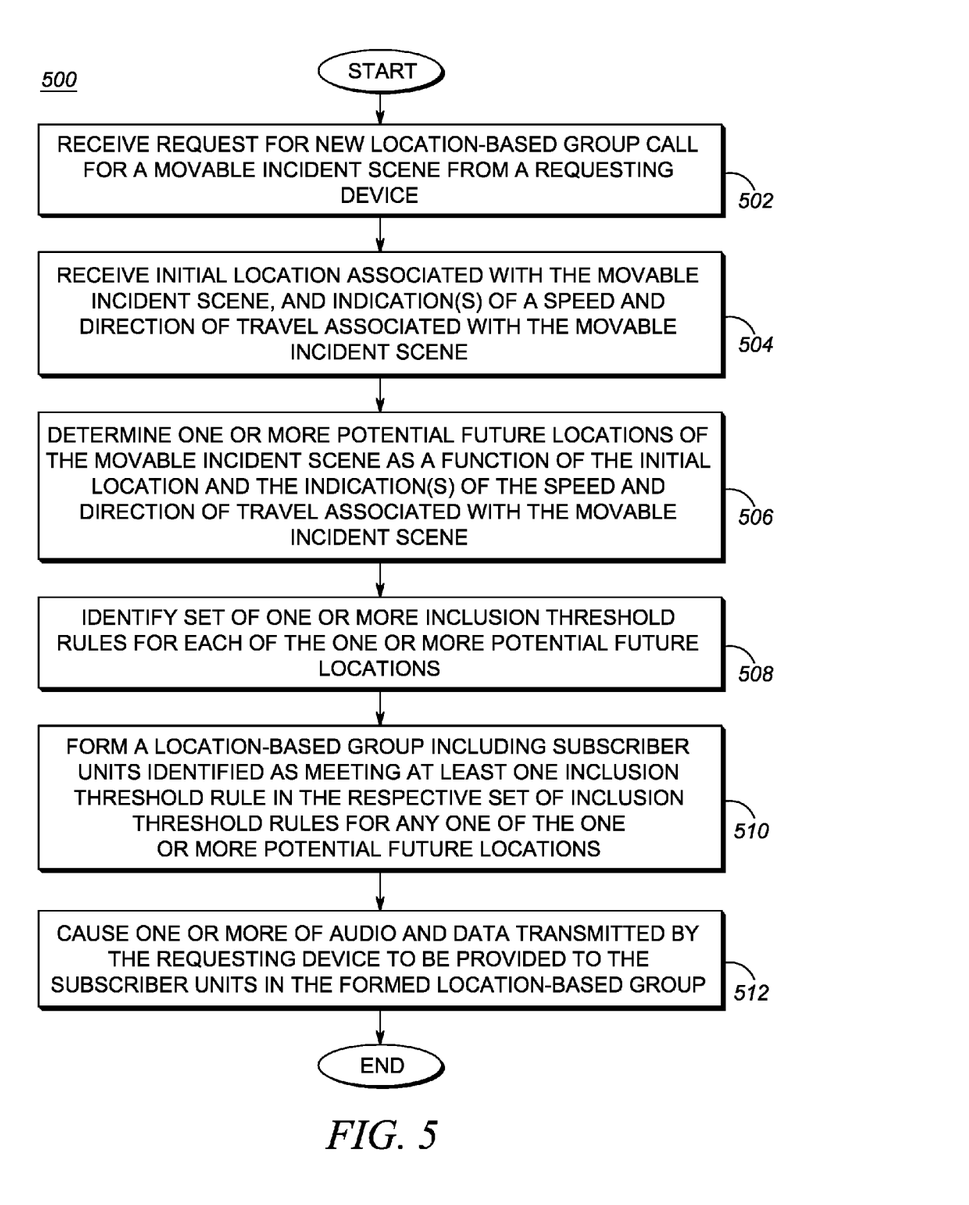
FIG. 5 is a flow chart illustrating processing steps executable at the controller devices of FIG. 2, 3, or 4 for dynamically forming location-based groups for movable incident scenes in accordance with several embodiments.

At step 502, a controller in a RAN receives a request for a new location-based group call for a movable incident scene from a requesting device (e.g., one of a first potential responding SU and a dispatch console).

At step 504, the controller receives and/or retrieves an initial location associated with the movable incident scene and indication of a speed and direction of travel associated with the movable incident scene. The initial location, speed, and direction of travel may be received in a same packet, instruction, header, or embedded control signal as the location-based group call request, or may be sent in separate packets, instructions, headers, or embedded control signals. The initial location may be a same location as the requesting device (e.g., first potential responding SU), may be a location manually entered by an operator of the requesting device (e.g., first potential responding SU or dispatch console) or some other potential responding SU, may be a location reported by a tracking device or other location-enabled reporting device associated with the movable incident scene itself, may be some defined location automatically determined by the controller, perhaps with aid from other infrastructure components within the RAN or outside of the RAN, and/or may be determined by the controller in any of the manners set forth above with respect to FIGS. 2 and 3. The defined location may be comprised of, for example, GPS coordinates or other form of latitude and longitude coordinates. In other embodiments, Cartesian or polar coordinate systems could be used instead or in addition. Future speed and direction of travel associated with the movable incident scene may be predicted by the controller at step 504 in any of the manners set forth above with respect to FIGS. 2 and 3 using the indication or indications of speed and direction of travel received.

At step 506, the controller determines one or more potential future locations of the movable incident scene as a function of the initial location and the indication of the speed and direction of travel associated with the movable incident scene. As set forth with respect to FIGS. 2 and 3, the potential future locations could include one or more future locations along an estimated or predicted serial path determined as a function of the reported initial location of the movable incident scene and the indications of the speed and direction of travel of the movable incident scene, among other factors, and/or could include one or more future locations along a plurality of estimated or predicted potential parallel paths determined as a function of the reported initial location of the movable incident scene and the indication of the speed and direction of travel of the movable incident scene, among other factors that could possibly include available path information obtained via a CIS.

At step 508, the controller identifies a set of one or more inclusion threshold rules for each of the one or more potential future locations. In some embodiments, a same set of one or more inclusion threshold rules may be applied to each of the one or more potential future locations. In other embodiments, varying sets of inclusion threshold rules may be applied to each of the one or more potential future locations. In some embodiments, the controller may also identify a same or different set of inclusion threshold rules for the initial location. As set forth above with respect to FIGS. 2 and 3, each set of inclusion threshold rules may include one or more of distance-based inclusion threshold rules and arrival-time-based inclusion threshold rules, among other possibilities.

At step 510, the controller forms a location-based group including SUs identified as meeting at least one of the one or more inclusion threshold rules in the respective set of inclusion threshold rules for any one of the one or more potential future locations. In other embodiments, the controller may form a location-based group including identified SUs meeting all of the one or more inclusion threshold rules in the respective set of inclusion threshold rules for any one of the one or more potential future locations. In still further embodiments, the controller may form a location-based group including SUs meeting at least one of the one or more inclusion threshold rules in the respective set of inclusion threshold rules for any one of the one or more potential future locations or the initial location. Finally, the controller may form a location-based group including SUs meeting all of the one or more inclusion threshold rules in the respective set of inclusion threshold rules for any one of the one or more potential future locations or the initial location. Further, the controller may form the location-based group in any of the manners as set forth with respect to FIGS. 2 and 3 above, among other possibilities.

For example, forming a location-based group (e.g., talkgroup) may include assigning a unique talkgroup ID to the identified SUs. The unique talkgroup ID may be stored at the controller, reported to a separate PTT server within or external to the same RAN within which the controller is located, reported to the requesting device, and/or reported to the identified SUs in the formed group. The unique talkgroup ID may be a reserved talkgroup ID that is reserved for dynamic location-based talkgroups, or may be a randomly generated talkgroup ID that is determined to not already be in use by other SUs in the RAN. In other embodiments, forming a talkgroup may include assigning a particular conventional or trunked traffic channel for the call, or direct mode channel or talk-around channel for the call, and informing the requesting device and/or identified SUs in the formed group of the channel or channels assigned for the call. Other possibilities exist as well.

At step 512, the controller causes one or more of audio and data transmitted by the requesting device to be provided to the SUs in the formed location-based group. In one example, the controller itself or a PTT server associated with the controller may receive audio and/or data from the requesting device destined for the SUs in the formed group, and may then forward, via one or more unicast, multicast, or broadcast transmissions, the received audio and/or data to the SUs in the formed group. In another example, the controller may assign a particular repeater (conventional or trunked) or pair of repeaters to a frequency (or pair of frequencies) assigned to the formed group, such that the subsequent audio and/or data transmitted by the requesting device and received at the particular repeater (or one of the pair of particular repeaters) is subsequently repeated by the particular repeater (or other of the pair of particular repeaters) for receipt by the SUs in the formed group. In a still further example, the subsequent audio and/or data may be provided directly from the requesting device (e.g., first potential responding SU) to the SUs in the formed group via a direct mode transmission by the requesting device on an assigned direct mode or talk-around channel, perhaps using an assigned talkgroup identifier assigned by the controller. Finally, audio and/or data may be provided by the requesting device (e.g., the dispatch console) and routed, via the controller itself or via another device in the RAN under direction of the controller, to the SUs in the formed group via one or more repeaters assigned to the dispatch-console-sourced call. Other possibilities exist as well.

4. Conclusion

In accordance with the foregoing, an improved method and apparatus for dynamically forming location-based groups for movable incident scenes is disclosed, allowing incident and other types of response groups to be created more efficiently and a response to a moving incident scene coordinated more effectively.

As a result, a more intuitive, useful, and efficient group communications system can be provided, improving communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of dynamic location-based group formation for a movable incident scene in a wireless radio communication system comprising a plurality of first subscriber units, the method comprising:
   receiving, at a controller from one of a second subscriber unit and a dispatch console, a request for a new group call for a movable incident scene;
   receiving, at the controller, an initial location associated with the movable incident scene and an indication of a speed and direction of travel associated with the movable incident scene;
   determining, by the controller and as a function of the initial location and the indication of the speed and direction of travel associated with the movable incident scene, one or more potential future locations of the movable incident scene different from the initial location;
   determining, by the controller, a current location of each of the plurality of first subscriber units;
   identifying, by the controller, a set of one or more inclusion threshold rules for each of the one or more potential future locations, each set of inclusion threshold rules including one or more of a distance-based inclusion threshold rule and an arrival-time-based inclusion threshold rule relative to the respective potential future location;

forming, by the controller, one of (i) a location-based group including first subscriber units meeting at least one inclusion threshold rule in the respective identified set of inclusion threshold rules for any one of the one or more potential future locations, wherein the one or more potential future locations includes a plurality of potential future locations, and (ii) a location-based group including first subscriber units meeting at least one inclusion threshold rule in the respective identified set of inclusion threshold rules for any one of the one or more potential future locations or meeting an inclusion threshold rule for the initial location, further identified by the controller, wherein the identified inclusion threshold rule for the initial location comprises first subscriber units having current locations that fall within a maximum response distance associated with and relative to the initial location of the movable incident scene; and causing one or more of audio and data transmitted by the one of the second subscriber unit and the dispatch console to be provided to the first subscriber units in the formed location-based group.

2. The method of claim 1, wherein a first identified set of inclusion threshold rules for a first potential future location out of the one or more potential future locations comprises one of (i) first subscriber units having current locations that fall within a maximum response distance associated with and relative to the first potential future location and (ii) first subscriber units having an estimated arrival time $T_{ssu}$ at the first potential future location earlier than an estimated arrival time $T_{is}$ of the movable incident scene at the first potential future location of the movable incident scene.

3. The method of claim 2, wherein the first identified set of inclusion threshold rules for the first potential future location comprises first subscriber units having current locations that fall within a maximum response distance associated with and relative to the first potential future location of the movable incident scene.

4. The method of claim 3, wherein a plurality of maximum response distances are associated with each potential future location and are made to vary depending upon various modes of transport associated with the first subscriber units.

5. The method of claim 2, wherein the first identified set of inclusion threshold rules for the first potential future location comprises first subscriber units having an estimated arrival time $T_{ssu}$ at the first potential future location earlier than an estimated arrival time $T_{is}$ of the movable incident scene at the first potential future location of the movable incident scene.

6. The method of claim 5, further comprising accessing, by the controller, a cartographic database of motor vehicle paths;
wherein the estimated arrival time $T_{is}$ of the movable incident scene at each of the determined one or more potential future locations and the estimated arrival time $T_{ssu}$ of each of the plurality of the first subscriber units at each of the determined one or more potential future locations are determined, by the controller, as a function of a plurality of available paths retrieved from the cartographic database relative to the initial location and the speed and direction associated with the movable incident scene.

7. The method of claim 6, wherein the estimated arrival time $T_{is}$ of the movable incident scene at each of the determined one or more potential future locations and the estimated arrival time $T_{ssu}$ of each of the plurality of the first subscriber units at each of the determined one or more potential future locations are further determined, by the controller, as a function of one or more of current traffic information, current weather condition information, and time of day information.

8. The method of claim 2, wherein the first identified set of inclusion threshold rules for a first potential future location out of the one or more potential future locations comprises both of (i) first subscriber units having current locations that fall within a maximum response distance associated with and relative to the first potential future location and (ii) first subscriber units having an estimated arrival time $T_{ssu}$ at the first potential future location earlier than an estimated arrival time $T_{is}$ of the movable incident scene at the first potential future location of the movable incident scene; and
wherein the step of forming, by the controller, the location-based group comprises including first subscriber units meeting all of the inclusion threshold rules in the first identified set of inclusion threshold rules for the first potential future location.

9. The method of claim 1, wherein forming the location-based group comprises including first subscriber units meeting at least one inclusion threshold rule in the respective identified set of inclusion threshold rules for any one of the one or more potential future locations and first subscriber units meeting the identified inclusion threshold rule for the initial location.

10. The method of claim 1, wherein forming the location-based group includes first subscriber units meeting the at least one inclusion threshold rule in the respective identified set of inclusion threshold rules for any one of the one or more potential future locations, wherein the one or more potential future locations includes a plurality of potential future locations, and further wherein the maximum response distance associated with each determined plurality of potential future location increases as the distance between the initial location and each respective potential future location increases.

11. The method of claim 1, wherein the request is received at the controller from the second subscriber unit, and the initial location is received at the controller from the second subscriber unit.

12. The method of claim 11, wherein the speed and direction of travel associated with the movable incident scene are both provided to the controller by the second subscriber unit.

13. The method of claim 11, wherein the speed and direction of travel associated with the movable incident scene are both determined by the controller as a function of a plurality of locations provided to the controller by the second subscriber unit over time.

14. The method of claim 1, wherein the initial location and the speed and direction of travel associated with the movable incident scene are both provided to the controller by the dispatch console.

15. The method of claim 1, the method further comprising accessing, by the controller, a cartographic database of motor vehicle paths;
wherein the one or more potential future locations of the movable incident scene are further determined, by the controller, as a function of a plurality of available paths retrieved from the cartographic database relative to the initial location and the speed and direction associated with the movable incident scene.

16. The method of claim 1, further comprising assigning a group identifier to the formed group, and providing the group identifier to the one of the second subscriber unit and the dispatch console, and to all first subscriber units in the formed group.

17. The method of claim 1, wherein causing the one or more of audio and data transmitted by the one of the second subscriber unit and the dispatch console to be provided to the first subscriber units in the formed group comprises the second subscriber unit transmitting the one or more of audio and data with the group identifier, the first subscriber units directly receiving the one or more of audio and data transmitted by the first subscriber unit, and the first subscriber units playing back the received one or more of audio and data.

18. The method of claim 1, wherein causing the one or more of audio and data transmitted by the one of the second subscriber unit and the dispatch console to be provided to the first subscriber units in the formed group comprises receiving the one or more of audio and data transmitted by the one of the second subscriber unit and the dispatch console at one of a push-to-talk (PTT) server and a repeater, and forwarding, via the one of the PTT server and the repeater, the one or more of audio and data transmitted by the one of the second subscriber unit and the dispatch console to the first subscriber units in the formed group.

19. A controller for dynamic location-based group formation for a movable incident scene, the controller comprising:
a transceiver;
a data store; and
one or more processors configured to:
receive, via the transceiver and from one of a second subscriber unit and a dispatch console, a request for a new group call for a movable incident scene;
receive, via the transceiver, an initial location associated with the movable incident scene and an indication of a speed and direction of travel associated with the movable incident scene;
determine, as a function of the initial location and the indication of the speed and direction of travel associated with the movable incident scene, one or more potential future locations of the movable incident scene different from the initial location;
determine a current location of each of the plurality of first subscriber units;
identify a set of one or more inclusion threshold rules for each of the one or more potential future locations, each set of inclusion threshold rules including one or more of a distance-based inclusion threshold rule and an arrival-time-based inclusion threshold rule relative to the respective potential future location;
form, by the controller, one of (i) a location-based group including first subscriber units meeting at least one inclusion threshold rule in the respective identified set of inclusion threshold rules for any one of the one or more potential future locations, wherein the one or more potential future locations includes a plurality of potential future locations, and (ii) a location-based group including first subscriber units meeting at least one inclusion threshold rule in the respective identified set of inclusion threshold rules for any one of the one or more potential future locations or meeting an inclusion threshold rule for the initial location, further identified by the controller, wherein the identified inclusion threshold rule for the initial location comprises first subscriber units having current locations that fall within a maximum response distance associated with and relative to the initial location of the movable incident scene; and
cause, via the transceiver, one or more of audio and data transmitted by the one of the second subscriber unit and the dispatch console to be provided to the first subscriber units in the formed location-based group.

20. The controller of claim 19, wherein a first identified set of inclusion threshold rules for a first potential future location out of the one or more potential future locations comprises one of (i) first subscriber units having current locations that fall within a maximum response distance associated with and relative to the first potential future location and (ii) first subscriber units having an estimated arrival time $T_{ssu}$ at the first potential future location earlier than an estimated arrival time $T_{is}$ of the movable incident scene at the first potential future location of the movable incident scene.

* * * * *